July 5, 1927.
A. G. E. HULTGREN ET AL
1,635,082
SELF LOCKING NUT
Filed June 7, 1922
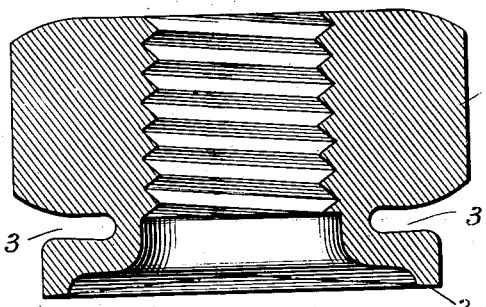
Fig. 1.
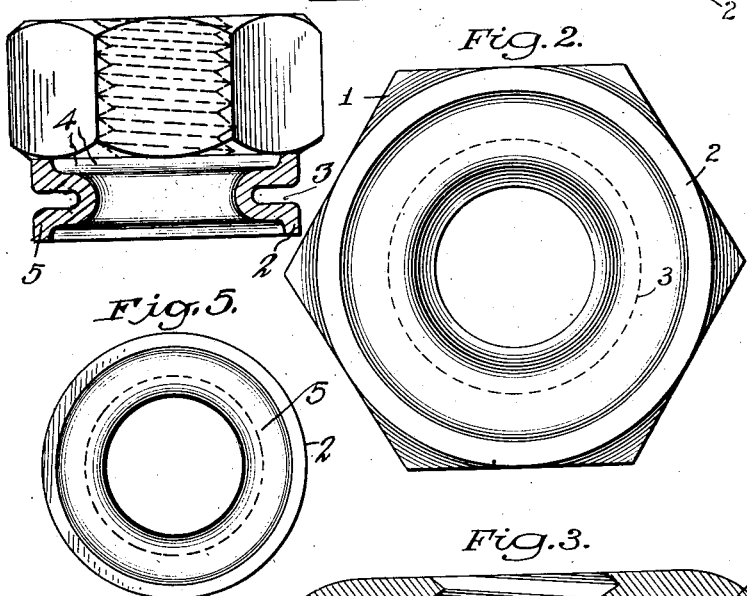
Fig. 4.
Fig. 2.
Fig. 5.
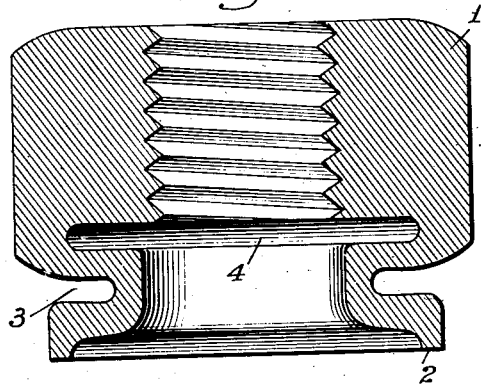
Fig. 3.
INVENTOR
A. G. E. Hultgren
J. N. E. Thorén
BY
Rogers, Kennedy Campbell
ATTORNEYS.

Patented July 5, 1927.

1,635,082

UNITED STATES PATENT OFFICE.

AXEL GUSTAF EMANUEL HULTGREN AND JOSEF HENRIK EMANUEL THORÉN, OF GOTTENBORG, SWEDEN, ASSIGNORS TO AKTIEBOLAGET SVENSKA KULLAGERFABRIKEN, OF GOTTENBORG, SWEDEN, A CORPORATION OF SWEDEN.

SELF-LOCKING NUT.

Application filed June 7, 1922, Serial No. 566,534, and in Sweden June 15, 1921.

This invention relates to self-locking nuts wherein the threaded portion or nut proper carries a springy part divided from the threaded portion by an exterior annular slot, such springy part being adapted to be brought into engagement with the abutment onto which the nut is screwed.

The object of the invention is to prevent the nut, by means of the friction created in tightening between the springy part and the abutment, from working loose and to thereby positively and effectively lock the nut, notwithstanding the relative axial movements, due to axial vibration, between the bolt and the abutment or part onto which the nut is screwed.

The invention consists, essentially, in the springy part of the nut forming a strong disk-like spring having, at its bearing face, at or near the outer circumference of the nut, an annular bearing surface of a comparatively large extension in radial direction. The nut will thus bear on the abutment, or part onto which it is screwed, at the annular bearing surface where the moment of frictional force and, on account of the strength of the springy part, the pressure between the nut and the abutment is large so as to effectively lock the nut in position.

In the drawing, we have shown three forms of embodiment of a self-locking nut according to the invention. Fig. 1 shows an axial section and Fig. 2 shows a horizontal plan view of a nut according to the one form of embodiment. Fig. 3 shows an axial section of a somewhat modified nut. Fig. 4 shows a form of embodiment in which the springy part is entirely detached from the nut proper. Fig. 5 is a plan view of the springy part.

Referring first to Figs. 1 and 2, the nut proper or threaded part 1 carries, at its tightening side, an annular shoulder 2 situated at or near the outer circumference of the nut. The part carrying the shoulder 2 is divided by an outer annular slot 3 from the threaded portion or nut proper 1 so as to afford a spring action between the said parts by reason of a radial stretching of the annular shoulder. Only the part at one side of the slot, viz. the nut proper, is threaded. The surface of the shoulder 2 remote from the nut proper is preferably made somewhat conical in shape with its apex turned inward, toward the nut proper, as indicated by dashed and dotted lines in Fig. 1, so that, on tightening, said surface will be disposed in a transverse plane and, thus, a reliable bearing of the nut on the part onto which it is screwed afforded. In one aspect of the invention the springy part is connected to the threaded end by a neck of reduced cross section whereby the springy part lies entirely at one side of the thread in the nut.

The form of embodiment shown in Fig. 3 differs from that according to Figs. 1 and 2 merely in the nut 1 being provided, in addition to the outer annular slot 3, with an inner annular slot 4, resulting in an increased spring action. Only the part 1 at the side of the annular slot 4 farthest from the shoulder 2 is threaded.

The form of embodiment shown in Figs. 4 and 5 differs from that according to Fig. 3 in the nut proper 1 being entirely detached, at or near the plane thereof next to the inner annular slot 4, from the annular shoulder 2 so that, in conjunction with the nut proper 1, a springy washer 5 will be formed bearing on the nut as well as on the abutment at the outer circumference only where the lever arm of frictional force is large. In this form of embodiment, also the surface of the annular washer bearing on the nut proper is, suitably, made somewhat conical, the apex of the conical bearing surface lying outside the nut proper, so that, after tightening, the nut proper will bear firmly on the washer.

We claim:

1. A self-locking nut, comprising a thread and an unthreaded portion the unthreaded portion being set off from the threaded portion by a plurality of open circumferential slots overlapping each other and disposed in transverse planes.

2. A self-locking nut, comprising a threaded and an unthreaded portion the unthreaded portion being set off from the threaded portion by an interior circumferential slot and outwardly of such slot by an overlapping exterior circumferential slot, said slots being disposed in transverse planes.

3. A self-locking nut, comprising a threaded and an unthreaded portion the unthreaded portion being set off from the threaded portion by an interior circumferential slot and outwardly of such slot by an exterior circumferential slot, said slots being disposed in transverse planes, and, there being an annular bearing surface of a comparatively large extension in a radial direction outwardly of such slots.

In testimony whereof we have signed our names.

AXEL GUSTAF EMANUEL HULTGREN.
JOSEF HENRIK EMANUEL THORÉN.